United States Patent [19]

Floyd

[11] 4,235,004

[45] Nov. 25, 1980

[54] PULLER FOR REMOVING PULLEYS AND THE LIKE FROM SHAFTS

[76] Inventor: William G. Floyd, 504 Woodland Village, Birmingham, Ala. 35216

[21] Appl. No.: 14,057

[22] Filed: Feb. 22, 1979

[51] Int. Cl.[3] .............................................. B23P 19/04

[52] U.S. Cl. .............................................. 29/256; 29/257

[58] Field of Search .......................... 29/257, 264, 256

[56] References Cited

U.S. PATENT DOCUMENTS

| | | | |
|---|---|---|---|
| 1,436,429 | 11/1922 | Bean | 29/257 |
| 1,704,442 | 3/1929 | Parkinson | 29/257 |

FOREIGN PATENT DOCUMENTS

| | | | |
|---|---|---|---|
| 19703 | 4/1929 | Australia | 29/257 |
| 953439 | 5/1949 | France | 29/239 |

*Primary Examiner*—James L. Jones, Jr.
*Attorney, Agent, or Firm*—Hugh P. Carter

[57] ABSTRACT

Disclosed is an improved puller especially adapted for removing pulleys from the shafts of engines such as lawn mower engines, small tractor engines, etc. The puller comprises generally a box-like member of heavy steel plates with one open wall. A jack screw is threadedly associated with one wall and a pulley, mounted on the shaft, is adapted to be received in position for operative thrust engagement with an opposite wall. Running in on the jack screw forces the hub or central portion of the pulley into operative thrust contact with the opposite wall, whereby the shaft is moved axially of the pulley, thus effectively removing the pulley without damage.

1 Claim, 9 Drawing Figures

FIG. 1
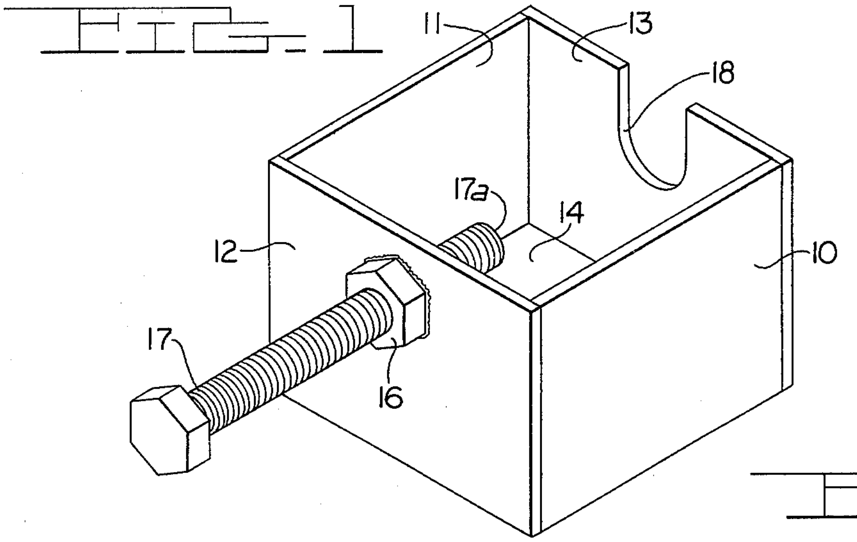
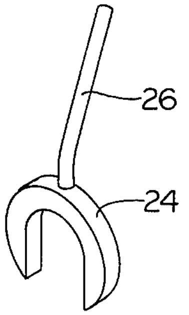
FIG. 4a
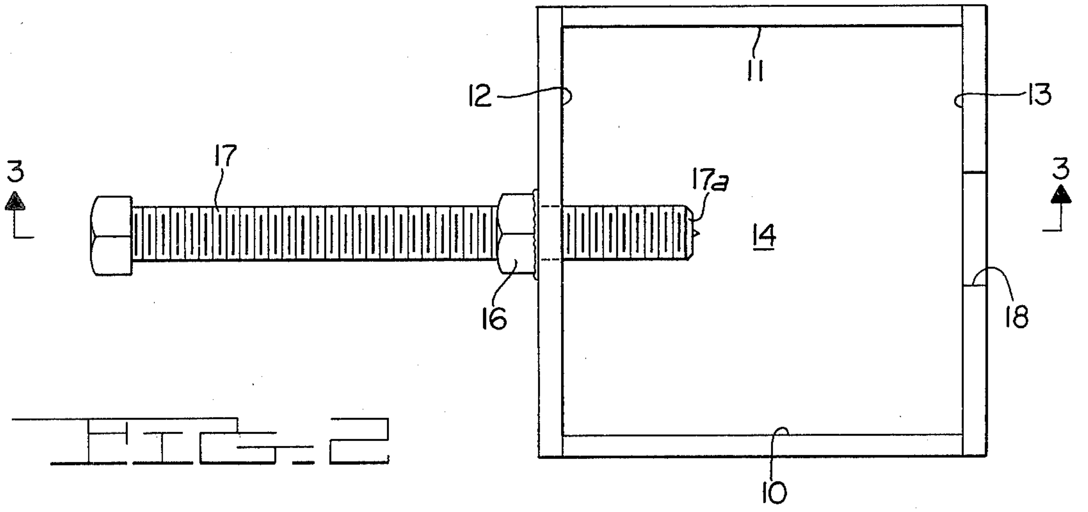
FIG. 2
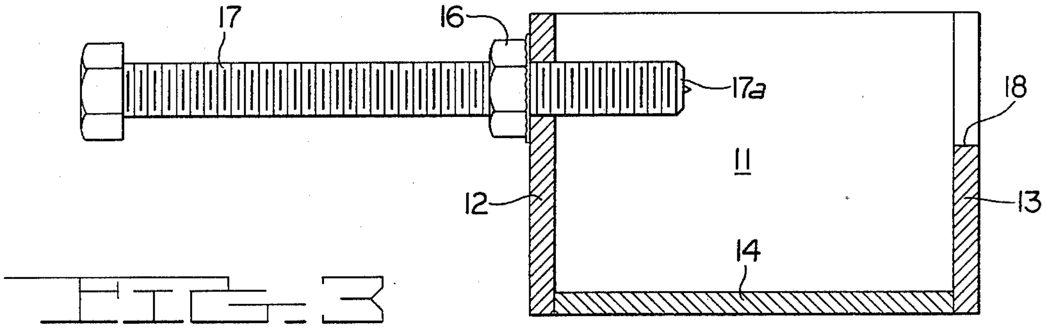
FIG. 3

FIG. 4
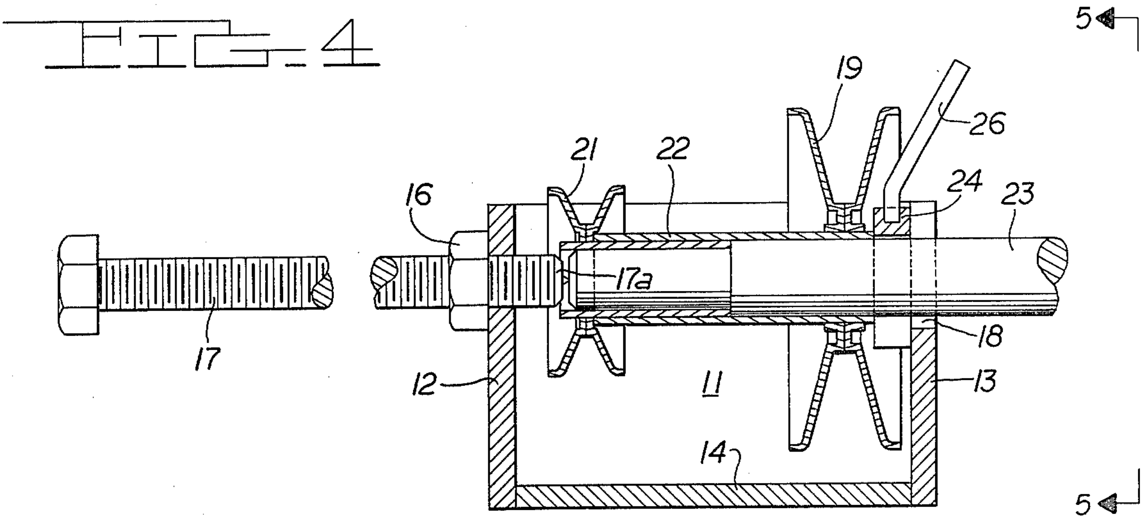
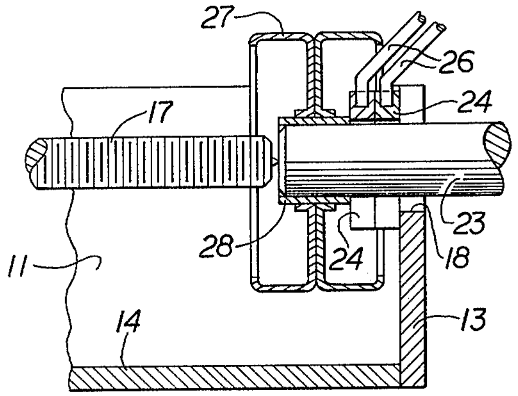
FIG. 6
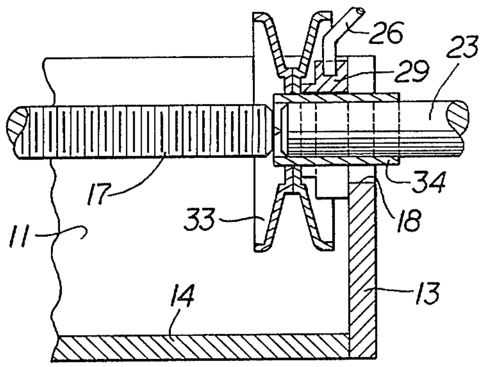
FIG. 7
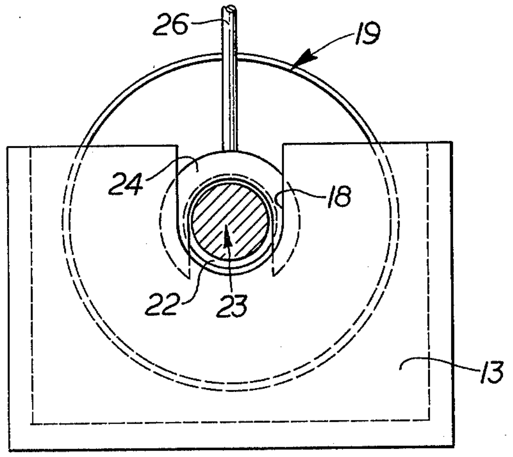
FIG. 5
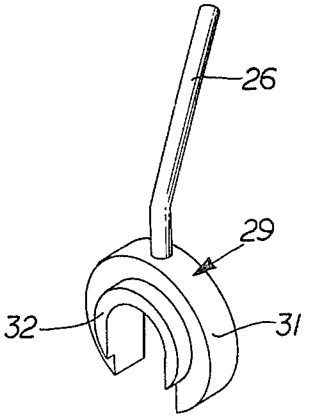
FIG. 7a

PULLER FOR REMOVING PULLEYS AND THE LIKE FROM SHAFTS

This invention relates to pullers especially adapted for removing pulleys, gears, sprockets and the like from engine shafts.

In the maintenance of devices such as lawn mowers, especially relatively heavy duty lawn mowers of the riding type, it is often necessary to remove the lower belt pulleys from the end of the engine shaft. Such pulleys are difficult to reach with conventional gear pullers because they are substantially hidden under the frame of the mower and are substantially out of reach of any conventional puller which can engage the pulley in the area of the hub thereof as distinguished from the periphery of the pulley itself. Pullers which engage such pulleys adjacent the periphery seldom accomplish more than simply to destroy the pulley by bending it, breaking it, or otherwise distorting it, whereby the hub of the pulley usually is left on the shaft. Therefore, with the usual, present-day puller the net result of trying to remove certain pulleys from shafts is to destroy the pulley without actually removing its hub.

My invention contemplates a puller in which the pulley may be removed from the shaft essentially without damage to the shaft or pulley, which operation may be performed even though the pulley is located with one side closely adjacent the under frame or deck of a mower or like vehicle.

My invention contemplates a puller of the character designated which comprises essentially a box of heavy steel plates with one open side. A jack screw is threadedly engaged with one side wall and the wall opposite said side wall carrying the jack screw is notched out to receive the shaft or the hub of the pulley to be removed. The parts of my improved puller are so dimensioned as to receive the pulley to be removed with the engine side of the pulley in thrust engaging relation to the wall opposite the jack screw. Upon contacting the free end of the shaft with the jack screw, it is moved axially of the pulley, thus to remove the pulley. If necessary, suitable shims may be provided to assure axial contact of the hub portion only of the pulley with the wall opposite the jack screw.

A puller illustrating features of my invention is shown in the accompanying drawings forming a part of this application in which:

FIG. 1 is an isometric view of my improved puller;

FIG. 2 is a plan view;

FIG. 3 is a detail sectional view taken generally along line 3—3 of FIG. 2;

FIG. 4 is a view corresponding to FIG. 3 with a double pulley mounted on a shaft and in position for removal by my improved puller;

FIG. 4*a* is a view of a shim which may be used with pulleys of the type shown in FIG. 4;

FIG. 5 is a detail view taken generally along line 5—5 of FIG. 4;

FIG. 6 is a fragmental detail view of a portion of the apparatus as shown in FIG. 4 with a different form of pulley on a shaft, inserted for removal and showing the use of a pair of shims in the removal operation;

FIG. 7 is another detail fragmental view similar to FIG. 6 and showing a different form of pulley and different form of shim; and, FIG. 7*a* is a view of the shim shown in place between the pulley and the opposite wall of the puller in FIG. 7.

Referring now to the drawings for a better understanding of my invention the same comprises an open, box-like structure of heavy steel plates suitably welded or otherwise secured together. Thus, the frame of the puller may comprise the end walls 10 and 11, side walls 12 and 13, and a bottom wall 14. The terms "side wall", "end wall", and "bottom wall" are all relative references as will appear. Suffice it to say that the frame of my improved puller is generally as shown, and preferably is a box with one wall missing.

Secured to the wall 12 as by welding is a nut 16. A jack screw 17 is threadedly associated with the nut so that the inner end 17*a* thereof projects inside the box-like frame.

The wall 13 is provided with a generally U-shaped cut-out 18. This may be large enough in size only to receive the shaft on which the pulley to be removed is located, or if desired, may be large enough to accommodate a projecting hub of a pulley.

As stated, one of the prime uses of my invention is to remove from the shafts of lawn mower engines the lower pulley assembly. Generally, and as shown for instance in FIG. 4, the puller assemblies on these lawn mowers may comprise an upper larger diameter V-groove pulley 19 to receive a V-belt and a lower pulley 21 to receive another V-belt. These pulleys generally are mounted on a common hub 22 and usually they are press fitted onto the lower end of a shaft 23 of the engine for the lawn mower. As will be understood, also, the pulley 19 is usually located very closely against the deck plate of the mower so that it is virtually impossible to secure the usual form of gear puller about the shaft 23 in position to engage the hub 22 of the pulley combination. Therefore, it is customary to engage the arms of the usual wheel puller about the periphery of the pulley 19 or 21 and with its thrust contacting the free end of shaft 23. Placing a strain on such an arrangement usually bends the flanges of the pulley downwardly, not only ruining the pulley, but making it still more difficult to remove the hub of the pulley from the shaft.

With my invention the open box-like member is placed as indicated in FIG. 4 about the shaft with the shaft extending through the cut-out 18. The end 17*a* of the jack screw engages against the free end of the shaft 23, ready to push the shaft out of the pulley assembly.

In the event the pulley is dished or concave as shown in FIG. 4, I may provide a U-shaped spacer or shim 24 which may be equipped with a handle 26. This spacer simply slips over the shaft 23, thereby spacing the pulley assembly away from the wall, assuring that the thrust force generated by the jack screw 17 is imparted to wall 13 at the hub 22 as distinguished from being imparted to the pulley assembly at other positions outwardly of the hub.

With the shaft and pulley in place as shown in FIG. 4 the jack screw is run in, forcing the hub of the pulley, through the spacer 24, into operative thrust transmitting relation to the end wall 13. The pulley thus is removed by sliding movement relative to the shaft 23.

In FIG. 6 I show a different form of pulley 27 which may be a double sheet metal structure secured to a hub 28. If the hub is shorter than the actual length of the pulley it may be necessary to use two or more of the spacers 24 to assure transmitting the thrust to wall 13.

In FIG. 7 I show the removal of a pulley with a stepped spacer 29 shown more in detail in FIG. 7*a*. Thus, the spacer 29 may have an enlarged portion 31 adapted to fit against the wall 13 and a reduced, axially extending shoulder portion 32 adapted to contact the pulley 33 in the hub area 34 thereof.

In view of the foregoing it will be seen that I have devised an improved and effective puller for removing pulleys from those installations or places where it is impossible to contact the hub of the pulley to be removed with the arms of the conventional gear puller. It will be noted that the jack screw preferably is located substantially at the longitudinal center of the wall 12, that is to say, centrally of the right to left dimension of the wall 12 as viewed in FIG. 1. Further, the center of the jack screw 17 is axially aligned with the center of the opening 18.

In actual practice my invention has proved to be extremely satisfactory and has solved a problem of long standing for mechanics who repair lawn mowers of the type with the pulleys "hidden" under the deck plate or other frame structures.

While I have shown my invention in but one form, it will be obvious to those skilled in the art that it is not so limited, but is susceptible of various changes and modifications without departing from the spirit thereof.

What I claim is:

1. In a puller for removing pulleys from engine crank shafts, (a) a rectangular box-like frame of heavy plates having four side walls and one end wall, (b) a jack screw threadedly passing through one side wall adjacent the longitudinal center thereof, the longitudinal axis of the screw being substantially normal to the side wall opposite the wall through which the screw passes, (c) a cut-out in the side wall opposite the screw-equipped wall of a size to slip over the shaft from which the pulley is to be removed, (d) means in the form of a U-shaped spacer having an enlarged portion and a reduced shoulder portion on opposite sides interposed between a central or hub portion of the pulley and said side of the frame opposite that through which the screw passes and said reduced shoulder portion being effective to transmit the thrust from the jack screw to said central or hub portion of the pulley, and (e) the inner open dimensions of the box-like frame being such as to receive the shaft mounted pulley with the free end of the shaft axially aligned with the end of the screw inside the frame and with a portion of the pulley opposite the free end of the shaft operatively contacting the inner surface of said opposite side wall, whereby running in on said jack screw forces the shaft axially relative to the pulley.

* * * * *